INVENTORS
EDWIN E. FOSTER
THOMAS E. FOSTER

BY Barnes, Kisselle, Raisch & Choate

ATTORNEYS

INVENTORS
EDWIN E. FOSTER
THOMAS E. FOSTER

ATTORNEYS

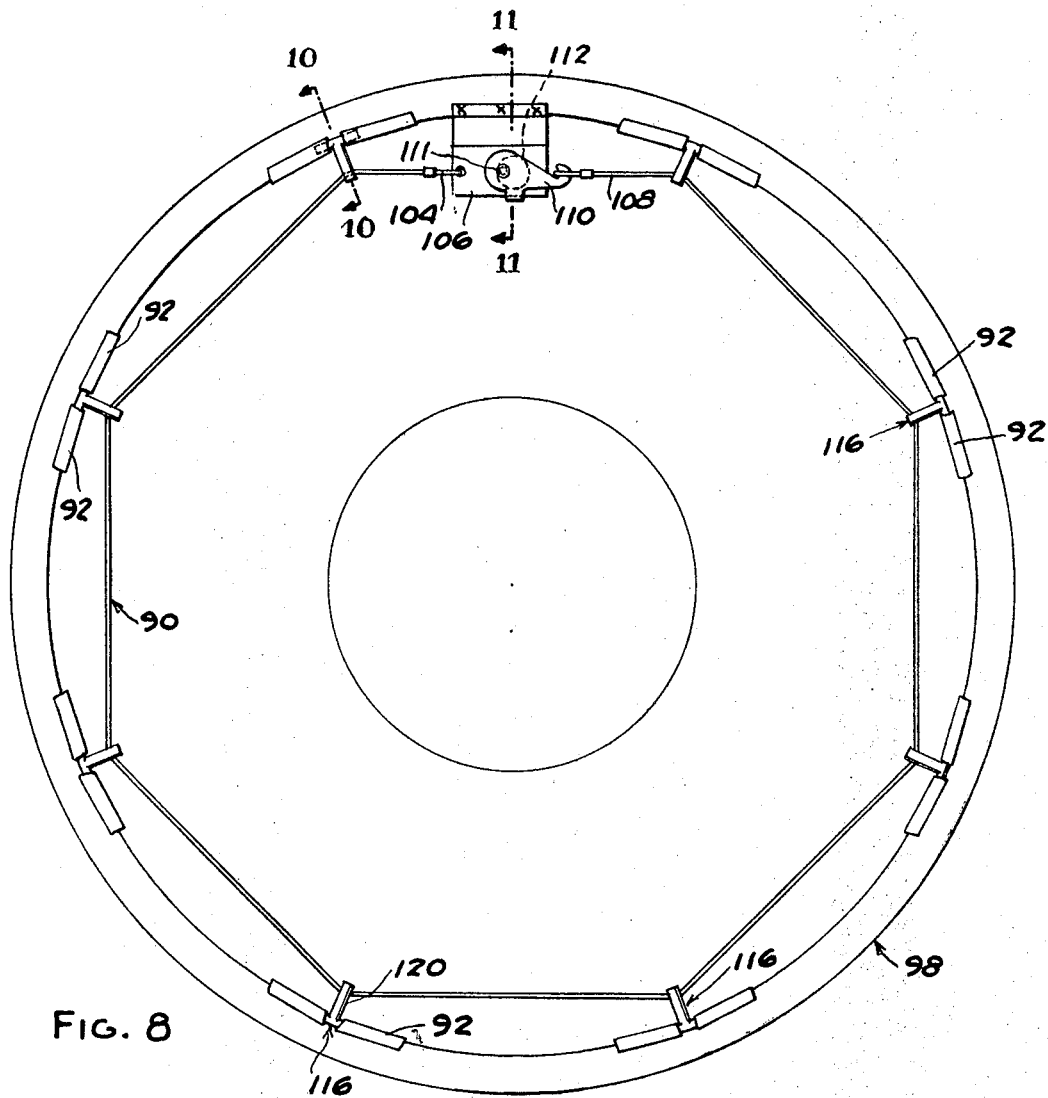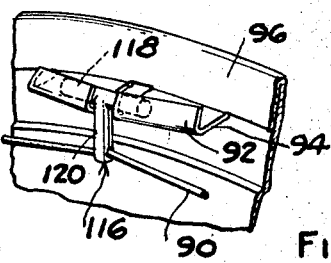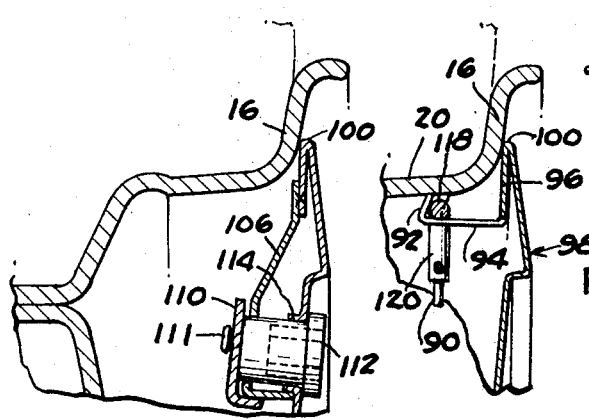

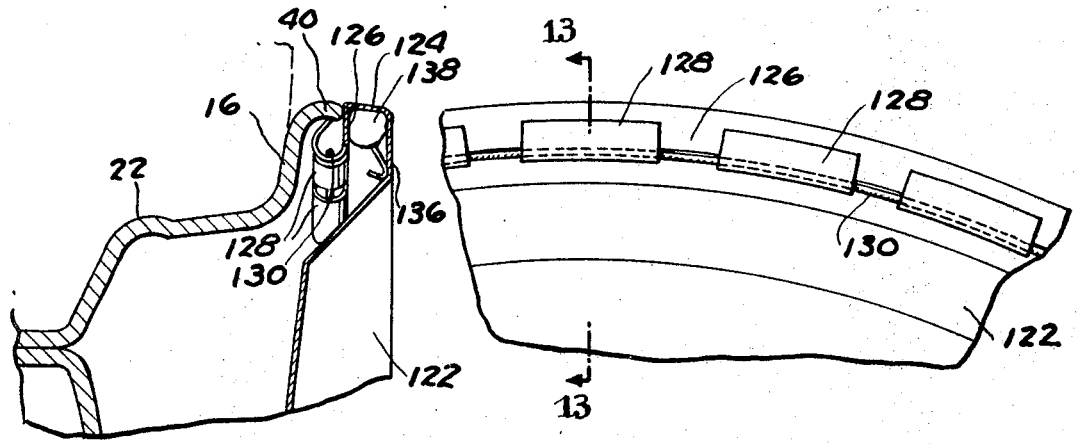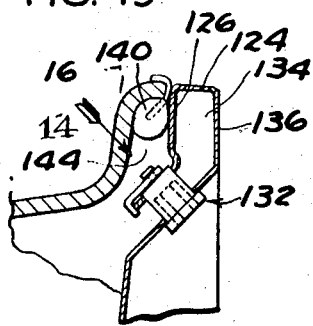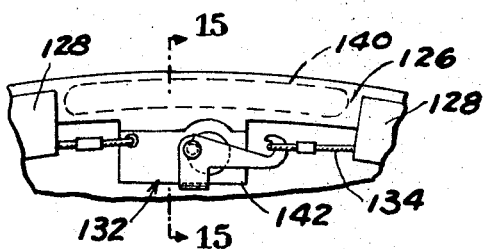

United States Patent Office 3,532,385
Patented Oct. 6, 1970

3,532,385
WHEEL COVER
Edwin E. Foster, P.O. Box 714, Austin, Tex. 78767,
and Thomas E. Foster, Austin, Tex.; said Thomas E.
Foster assignor to said Edwin E. Foster
Filed Jan. 23, 1969, Ser. No. 793,388
Int. Cl. B60b 7/06
U.S. Cl. 301—37                                19 Claims

ABSTRACT OF THE DISCLOSURE

A cover for a vehicle wheel having a plurality of spring claws on the inner side thereof which are adapted to engage an annular surface on the wheel rim to retain the cover on the wheel. A circumferentially contractable wire is interengaged with the spring claws and when contracted is interengaged with the spring claws and when contracted is adapted to flex the claws radially inwardly out of engagement with the annular surface on the wheel rim to facilitate mounting of the cover on the wheel and removal of the cover from the wheel.

---

This invention relates to vehicle wheel covers and more specifically to wheel covers of the type wherein the means for retaining the cover on a vehicle wheel comprises a plurality of generally axially extending spring claws on the inner face of the cover adapted to engage with the wheel rim.

Vehicle wheel covers of the above described type have several disadvantages associated with them. Mounting and removal of such covers on wheels necessarily result in gouging the wheel rim and the removal of paint therefrom. In addition, with wheel covers of the above described type the application of the cover to the wheel and removal of the cover from the wheel are time consuming operations which, if not performed properly, are apt to result in bending of several of the spring claws beyond their elastic limit and thereby rendering them useless for the purpose of retaining the cover on the wheel.

The present invention has for its primary object the facilitating of counting of such covers on a vehicle and their removal therefrom.

More specifically the invention has for an object the provision of means engageable with the conventional spring claws on a wheel cover for flexing the claws radially inwardly to clear the annular surface on the rim when it is desired to either mount the cover on the wheel or remove it from the wheel.

A further object of the invention resides in the provision of an annular, circumferentially contractible member engagable with the spring claws on a wheel cover and adapted when contracted to flex the spring claws radially so as to clear the annular surface on a wheel rim which the claws are adapted to engage to retain the cover on the wheel.

In connection with the last-mentioned object, it is a further object of this invention to provide a wheel cover construction wherein said contractible member is adapted to be actuated from the outer side of the cover.

In the drawings:

FIG. 8 is a plan view of the inner side of another embodiment of wheel cover according to the present invention.

FIG. 9 is a fragmentary perspective view of a portion of the cover shown in FIG. 8.

FIG. 10 is a fragmentary sectional view along the line 10—10 in FIG. 8 and showing the cover mounted on a vehicle wheel.

FIG. 11 is a view similar to FIG. 10 and taken along the line 11—11 in FIG. 8.

FIG. 12 is a fragmentary plan view of the rear side of another form of wheel cover according to the present invention.

FIG. 13 is a fragmentary sectional view taken along the line 13—13 in FIG. 12 and showing the cover mounted on a vehicle wheel.

FIG. 14 is a fragmentary plan view of the actuating mechanism of the wheel cover illustrated in FIGS. 12 and 13 as viewed in the direction of the arrow in FIG. 15.

FIG. 15 is a sectional view taken along the line 15—15 in FIG. 14 and showing the cover mounted on a wheel rim.

Figure 1:
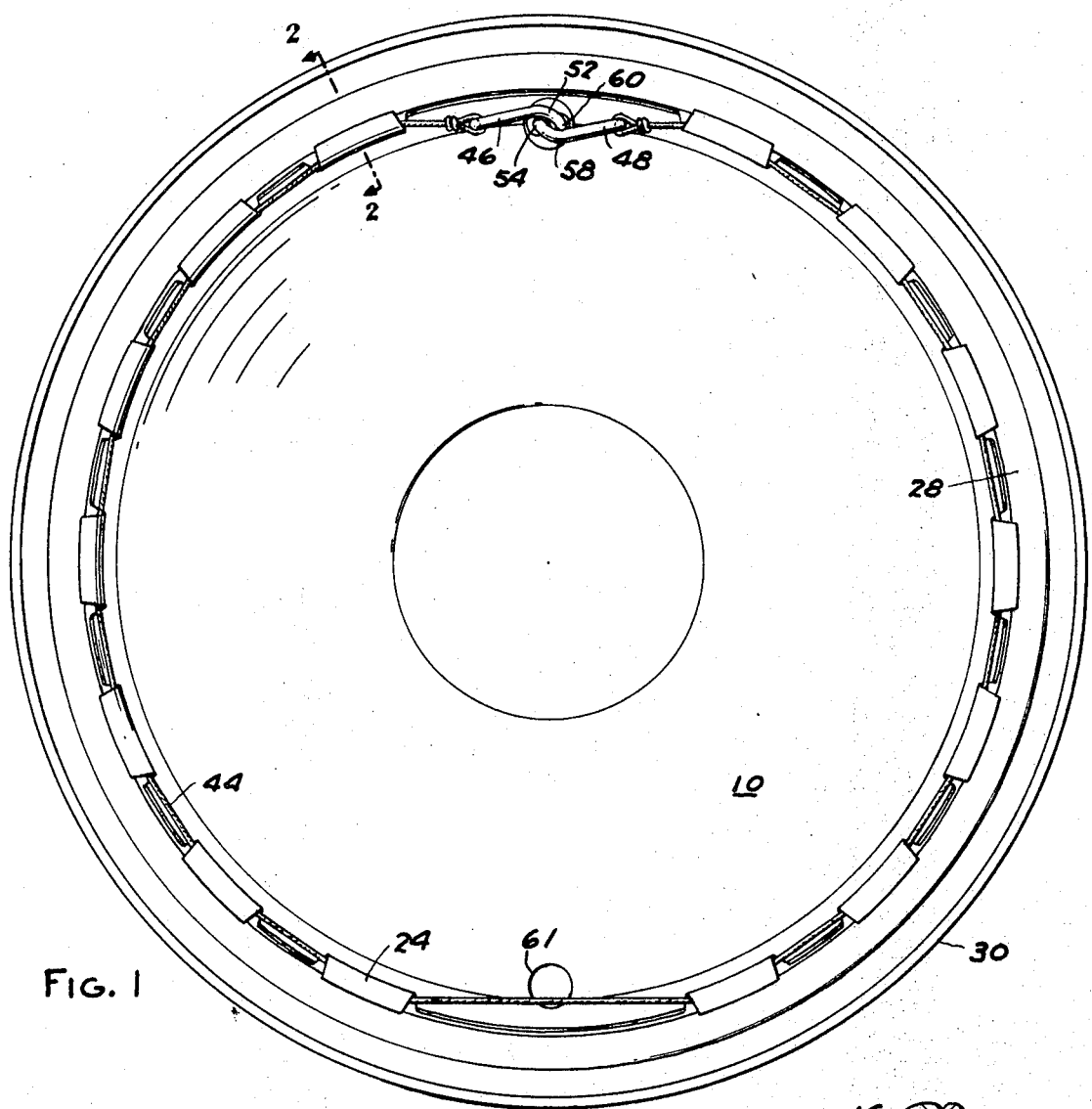
FIG. 1 is a plan view of the rear side of one form of wheel cover embodying the present invention.

The wheel cover of the present invention includes a front body portion 10 which is adapted to overlie a wheel 12 and which has a desired cross sectional configuration including an outer peripheral portion 14 adapted to overlie the tire bead retaining flange 16 of the wheel rim 18. The tire bead retaining seat is designated 20 and the safety groove on the rim is designated 22. Wheel covers of the type contemplated by the present invention have a plurality of spring claws on the inner face thereof for frictionally engaging the wheel rim. In the embodiment illustrated in FIGS. 1 through 3 the spring claws are arcuately shaped and designated 24. Claws 24 are formed on the inner ends of axially extending spring fingers 26. Spring fingers 26 are formed as axially inward extensions of a ring 28. Ring 28 is secured on the rear face of body portion 10 of the wheel cover by crimping the outer peripheral edge 30 of the cover over the outer peripheral edge 32 of ring 28. As is seen in FIG. 2, ring 28 is shaped as at 34 to provide a clearance space between the outer peripheral edge portion 14 of the cover 10 and the bead retaining flange 16 of the wheel rim to accommodate therein a conventional wheel balancing weight 36 which is retained on the rim by means of a bendable tab 38.

In a wheel cover of conventional construction the cover is mounted on the rim by locating the cover concentrically over the outer face of the wheel and then forcibly urging the cover axially inwardly as by means of a rubber mallet or the like to flex the spring fingers 26 radially inwardly and thereby allow the claws 24 to bight into and grip the inner peripheral surface of tire bead seat 20. Likewise, with a conventional wheel cover when it is desired to remove the cover from the wheel a prying tool (such as a screwdriver or the like) is wedged between the crimped edge 30 of the cover and the free edge 40 of the tire bead retaining flange 16 to pry the cover off the wheel. This operation usually results in the sharp free edges 42 of claws 24 gouging into the metal of the wheel and scraping the paint therefrom.

With a cover of the present invention the operation of mounting the cover on the wheel and removing it therefrom is simplified by providing separate means for flexing the spring fingers 26 radially inwardly to a position wherein the free edges 42 of claws 24 are adapted to clear the otherwise obstructing portions of the wheel rim. These means are in the form of a contractible annular member. In the arrangement illustrated in FIGS. 1 through 3 these means take the form of a wire or cable 44 which extends around spring fingers 26 and is seated within the arcuately shaped claws 24. At its opposite ends wire 44 is connected to a pair of links 46, 48. One end of each link 46, 48 may simply be shaped as a hook 50 as shown in FIG. 5 for engaging a loop at the opposite ends of wire 44. The other end of link 46 is bent as at 52 and pivotally connected as at 54 with a short lever 56. Likewise the opposite end portion of link 48 is bent as at 58 and pivotally connected as at 60 with lever 56 (FIG. 4) preferably located diametrically opposite the valve stem opening 61 in the cover. For the lack of a better descriptive term, links 46, 48 and lever 56 and the equivalent elements hereinafter described and disclosed will be referred to as a "rotary toggle mechanism."

Figure 2:
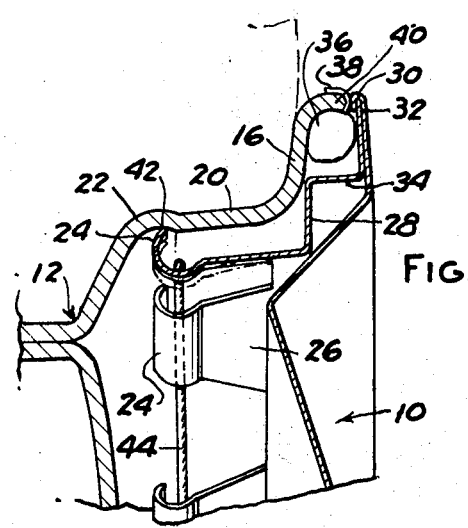
FIG. 2 is a sectional view along the line 2—2 in FIG. 1 and showing the wheel cover mounted on a conventional wheel.
Figure 3:
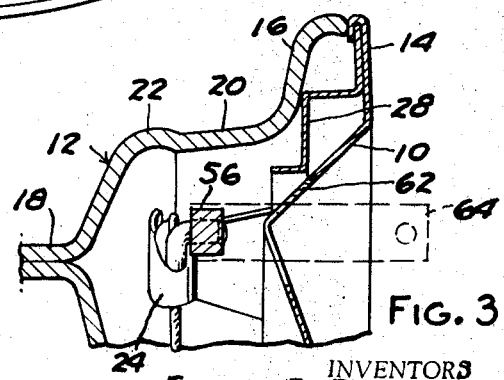
FIG. 3 is a view similar to FIG. 2 and taken along the line 3—3 in FIG. 4.
Figure 4:
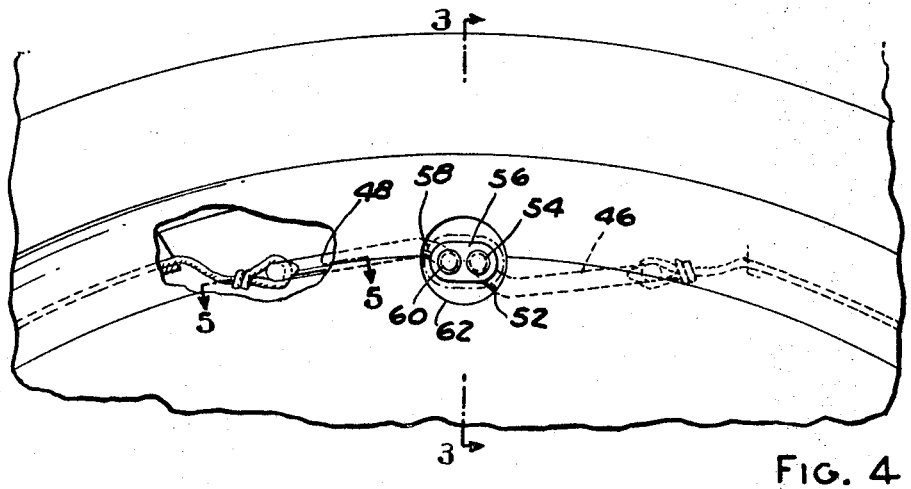
FIG. 4 is a fregmentary plan view of the front side of the cover shown in FIG. 1.
Figure 5:
FIG. 5 is a fragmentary detail view taken along the lyine 5—5 in FIG. 4.

As shown in FIG. 3, cover 10 is provided with an opening 62 therethrough which registers with lever 56 and through which a turning tool 64 may be inserted, engaged with lever 56 and rotated in a clockwise direction as viewed in FIG. 4 to revolve the pivotal connections 54, 60 to the position illustrated in FIG. 1 wherein the toggle mechanism is locked and wire 44 is circumferentially contracted. Wire 44 is circumferentially contracted because the pivotal connections 54, 60 have been shifted from the circumferentially spaced apart positions shown in FIG. 4 to the overlapped positions shown in FIG. 1. In the position illustrated in FIG. 1 the pivotal connections 54, 60 are in an "over-center" locked position and the toggle mechanism is retained in this locked position by the interengagement of the bent portions 52, 58 of links 46, 48, respectively.

When wire 44 is circumferentially contracted spring fingers 26 are flexed radially inwardly so that these fingers and their claws 24 are shifted from the position shown in solid lines to the position shown in broken lines in FIG. 2. In the latter position the sharp ends 42 of claws 24 define a circle having a diameter less than the inner diameter of the tire bead seat 20 of the rim adjacent the tire bead seat 20 so that the cover can be readily placed against the wheel or removed from the wheel. With wire 44 in the contracted condition and the cover placed concentrically against the wheel, when lever 56 is rotated in a counterclockwise direction as viewed in FIG. 4, wire 44 is circumferentially expanded and fingers 26, by reason of their spring tension, flex in a radially outward direction so that the sharp edges 42 of claws 24 frictionally engage the wheel rim. As shown in FIG. 2 spring fingers 26 are preferably dimensioned in length so that the sharp edges 42 of claws 24 will engage the wheel rim within the safety groove 22.

Figure 6:
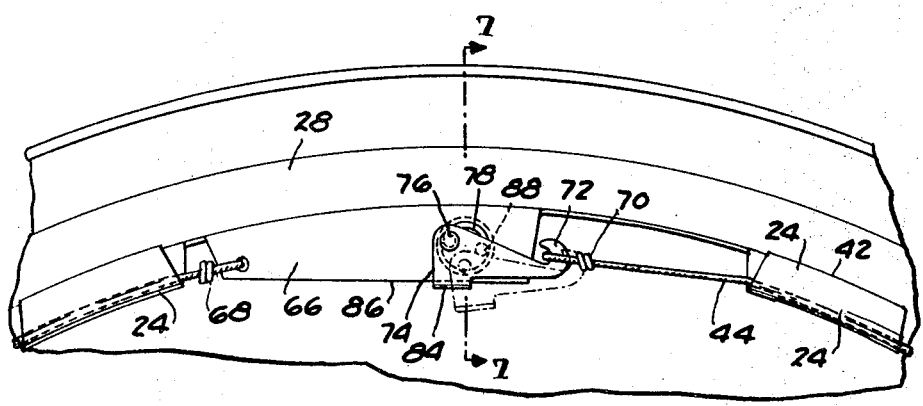
FIG. 6 is a fragmentary plan view of the rear side of a modified form of wheel cover.
Figure 7:
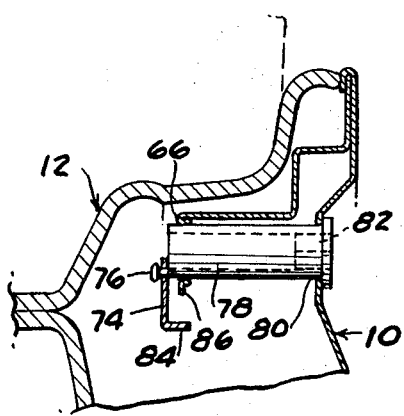
FIG. 7 is a sectional view along the line 7—7 in FIG. 6.

In FIGS. 6 and 7 there is illustrated another form of toggle mechanism. In this arrangement ring 28 is formed with relatively rigid anchoring flange 66 to which one end 68 of wire 44 is connected. The other end 70 of wire 44 is connected to the hooked portion 72 of a plate 74. Plate 74 is pivotally connected as at 76 with a rotatable stud member 78. The pivotal connection 76 is offset from the axis of stud member 78. Stud member 78 extends axially outwardly through an opening 80 in cover 10 and is provided with a noncircular socket 82 in the end thereof for the reception of a turning tool. Stud 78 is thus journalled for rotation about its central axis in cover 10 and in the anchoring flange 66 of ring 28.

In FIG. 6 the toggle mechanism is shown in the locked condition wherein wire 44 is circumferentially contracted. In this position it will be noted that the pivotal connection 76 between stud 78 and plate 74 is over-center and the toggle mechanism is retained in this locked over-center position by means of the bent over flange 84 on plate 74 which engages the radially inner edge 86 of flange 66. In FIG. 7 plate 74 is shown in its mid position; that is, a position wherein the pivotal connection 76 is disposed radially inwardlymost. In the released position of wire 44 pivotal connection 76 is disposed as indicated at 88 on the opposite side of the axis of stud 78 from the solid line position shown in FIG. 6. In the released position pivotal connection 88 aligns with the center axis of stud 78 and the line of tension of wire 44 at the end 70 thereof.

In the wheel cover arrangement illustrated in FIGS. 8 through 11 the circumferentially contractible wire 90 extends circumferentially within the circle defined by the spring claws 92. In this arrangement claws 92 are formed at the axially inner ends of spring fingers 94. Spring fingers 94 are in turn integrally connected with a flange 96 which is turned inwardly from around the outer periphery of the wheel cover 98. Spring fingers 94 are shorter than spring fingers 26 and claws 92 engage the inner periphery of the tire bead seat 20 of the rim. Likewise cover 98 has an outer diameter less than cover 10 so that its outer peripheral edge 100 engages the bead retaining flange 16 adjacent its junction with the tire bead seat 20.

One end 104 of wire 90 is anchored to a rigid bracket 106 spot welded to the inwardly turned flange 96 of cover 98. The other end 108 of wire 90 is connected to the hooked end of a plate 110 pivotally connected as at 111 to a stud member 112 journalled on bracket 106 and within a flanged opening 114 in cover 98 as shown in FIG. 11. Plate 110 and stud 112 provide a rotary toggle mechanism which is substantially the same as illustrated in FIGS. 6 and 7. Wire 90 is connected with spring claws 92 by means of T-shaped bars 116, the cross pieces 118 of which are seated within adjacent claws 92 and the stems 120 of which extend radially inwardly of the cover with the wire 90 passing through apertures adjacent the radially inner ends of the stems.

The operation of the cover mounting means shown in FIGS. 8 through 11 is substantially the same as previously described. Briefly stated, when stud 112 is rotated counterclockwise as viewed in FIG. 8 wire 90 is circumferentially expanded and spring fingers 94 flex in a radially outward direction because of the tension therein. When stud 112 is rotated clockwise to the locked position illustrated in FIG. 8 wire 90 is circumferentially contracted, causing the T-shaped bars 116 to shift radially inwardly and thus flexing spring fingers 94 inwardly to disengage claws 92 from the inner surface of the tire bead seat 20 on the wheel rim.

Cover 122 shown in FIGS. 12 through 15 has its outer peripheral edge portion turned axially inwardly as at 124 and then radially inwardly as at 126. The spring fingers and claws 128 are formed as extensions of the radially inwardly extending flange 126. Claws 128 are relatively short and located immediately adjacent the outer periphery of the cover so as to be capable of interengaging with the rolled over edge portion 40 of the tire bead retaining flange 16. The circumferentially contractible wire for flexing claws 128 radially inwardly is designated 130 and is adapted to be contracted and released by the toggle mechanism generally designated 132 in FIG. 14. In this arrangement the annular space 134 between flange 126 and the outer peripheral face 136 of the wheel cover is adapted to accommodate wheel balancing weights 138.

If it is desired to apply a wheel balancing weight to the wheel rather than the wheel cover, the balancing weight can be arranged as indicated at 140 in FIGS. 14 and 15. At the location of toggle mechanism 132 flange 126 is formed with a generally radially inwardly extending extension 142 instead of the spring claws 128. Since flange 126 extends radially inwardly it provides a clearance space 144 around the outer side of tire bead retaining flange 16 in which a single wheel balancing weight 140 may be located adjacent the toggle mechanism 132.

Figure 18:
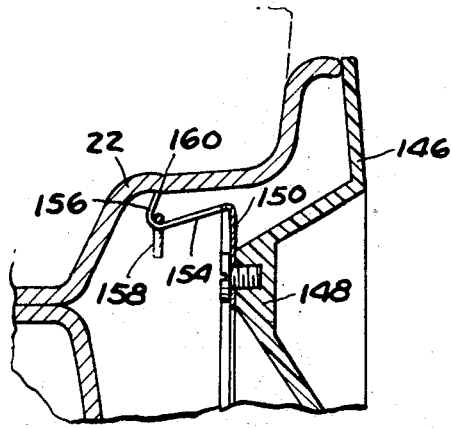
FIG. 18 is a view similar to FIG. 17 and taken along the line 18—18 in FIG. 16.
Figure 17:
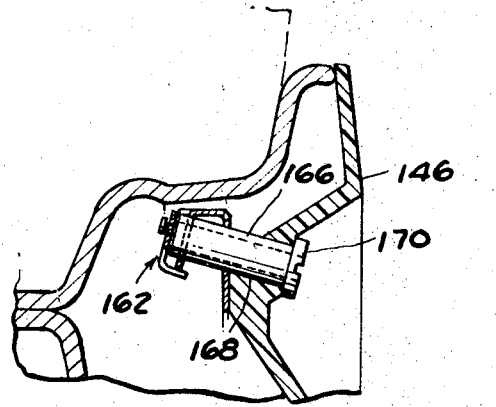
FIG. 17 is a fragmentary sectional view taken along the line 17—17 in FIG. 16 and showing the cover mounted on a vehicle wheel.
Figure 16:
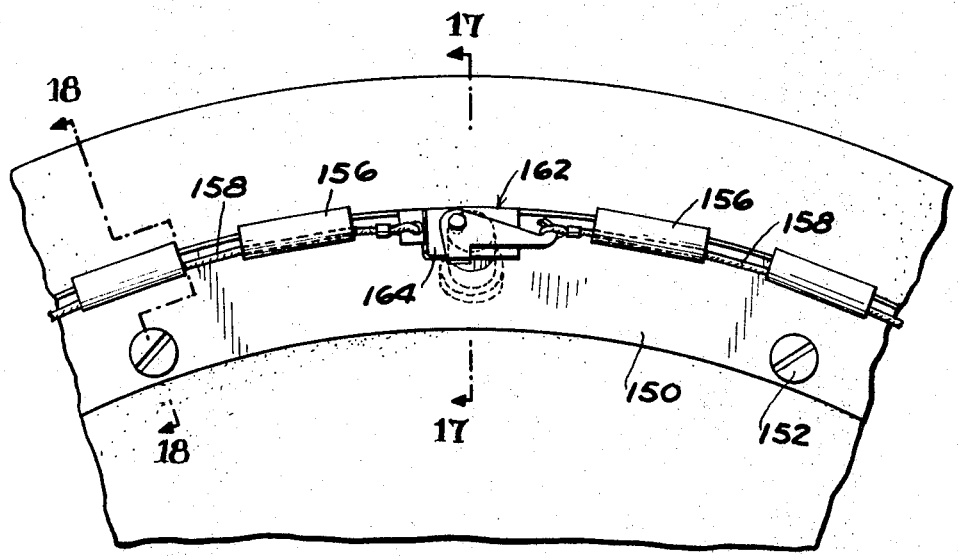
FIG. 16 is a fragmentary plan view of the rear side of another embodiment of wheel cover according to the present invention.

In the previous wheel cover embodiments illustrated and described the cover itself was formed as a stamped steel shell. It will be appreciated that the invention is not limited to a wheel cover formed of metal. In FIGS. 16 and 18 there is illustrated a wheel cover molded from plastic. The wheel cover itself is designated 146 and is preferably molded with an annular thickened boss 148. On the axially inner face of boss 148 there is secured a sheet metal ring 150 as by screws or the like 152. The outer periphery of ring 150 is formed with circumferentially spaced, axially inwardly extending spring fingers 154, the outer free ends of which are bent radially outwardly to form claws 156. The circumferentially expandable and contractible wire 158 is seated within claws 156 so that when the wire is contracted spring fingers 154 are flexed radially inwardly out of engagement with the rim to enable the cover to be retracted from within the wheel.

When wire 158 is released or expanded spring fingers 154 flex radially outward by reason of the spring tension therein so that the sharp edges 160 of claws 156 engage the inner surface of safety groove 22 on the wheel rim. The rotary toggle mechanism, generally designated 162 in FIG. 16, is similar to those previously described and is mounted on a U-shaped flange section 164 formed integrally with ring 150 between a pair of adjacent claws 156. The rotatable stud member 166 of toggle mechanism 162 extends through a bore 168 in cover 146 and is provided with an enlarged head 170 for accommodating a screwdriver or the like from the outer side of the cover for operating the toggle mechanism.

We claim:

1. A cover for a vehicle wheel of the type having an annular, radially inwardly facing surface on the rim concentric with the wheel axis, said cover having a plurality of axially inwardly extending and circumferentially spaced spring fingers thereon the free ends of which are formed as radially outwardly extending claws adapted to resiliently engage said annular surface to retain the cover on the wheel, said claws normally defining a circle having a diameter greater than said annular surface so as to require the fingers to be flexed radially inwardly to interengage the claws with said surface and means for flexing said fingers radially inwardly to facilitate placement of and removal of the cover on the wheel comprising a circumferentially contractible member operably connected with said spring fingers and adapted when contracted to flex said fingers radially inwardly and means accessible from the outer side of the cover for contracting said member.

2. A wheel cover as called for in claim 1 wherein said circumferentially contractible member comprises a flexible wire-like element.

3. A wheel cover as called for in claim 1 wherein said contractible member has a pair of opposed parted ends and said means for circumferentially contracting said member interconnects said parted ends.

4. A wheel cover as called for in claim 3 wherein said connecting means comprises a toggle mechanism.

5. A wheel cover as called for in claim 4 wherein said toggle mechanism includes a rotatable member, at least one end of said contractible member being connected to said rotatable member at a location offset from the axis of rotation of the rotatable member.

6. A wheel cover as called for in claim 4 wherein the cover has an aperture therethrough registering with said rotatable member for enabling rotation thereof from the outer side of the cover by means of a turning tool.

7. A wheel cover as called for in claim 1 wherein said annular surface of the wheel comprises a radially inwardly facing groove around the rim spaced axially inwardly of the tire bead seat.

8. A wheel cover as called for in claim 1 wherein said annular surface comprises a curved free edge portion of the rim around the outer edge of the tire bead retaining flange.

9. A wheel cover as called for in claim 8 wherein said cover is dimensioned to overlie said tire bead retaining flange and thus conceal said spring fingers.

10. A wheel cover as called for in claim 9 wherein said spring fingers are connected with the outer peripheral edge portion of the cover.

11. A wheel cover as called for in claim 9 wherein the peripheral edge portion of the cover has a portion thereof extending radially inwardly on the rear side thereof and forming a clearance space between a pair of adjacent spring fingers for accommodating a wheel balancing weight secured to said tire bead retaining flange.

12. A wheel cover as called for in claim 11 wherein said contracting means are mounted on the wheel cover at said clearance space and located radially inwardly of said fingers.

13. A wheel cover as called for in claim 1 wherein said wheel cover has a generally rigid flange on the rear side thereof adjacent its periphery, said contractible means comprising a rotatable toggle mechanism mounted on said flange.

14. A wheel cover as called for in claim 1 wherein said circumferentially contractible member has a pair of parted ends, one of said ends being fixedly anchored on the wheel cover and said contractible means comprises a rotatable toggle mechanism connected with the other end of the contractible member.

15. A wheel cover as called for in claim 14 wherein in said cover includes a relatively rigid flange portion on which said rotatable toggle mechanism is supported for rotation.

16. A wheel cover as called for in claim 1 including a circumferentially continuous metal ring mounted on the rear side of the cover, said spring fingers being integral with said ring.

17. A wheel cover as called for in claim 16 wherein said wheel cover comprises a plastic body adapted to overlie the wheel, said ring being secured to the rear face of said plastic body.

18. A wheel cover as called for in claim 1 wherein said spring fingers and claws define a circumferentially extending groove on the radially outer side of the spring fingers, said contractible member being seated in said groove.

19. A wheel cover as called for in claim 1 wherein said circumferentially contractible member is spaced radially inwardly of said spring fingers and including radially extending members interconnecting said spring fingers and the contractible member.

References Cited

UNITED STATES PATENTS

| | | |
|---|---|---|
| 2,076,789 | 4/1937 | Le Jeune. |
| 2,804,348 | 8/1957 | Lyon _____ 301—37 |
| 2,843,427 | 7/1958 | Vaughn. |
| 2,879,725 | 3/1959 | Zuver _____ 292—38 X |
| 2,969,257 | 1/1961 | Lyon. |

RICHARD J. JOHNSON, Primary Examiner

U.S. Cl. X.R.

220—47; 292—256.65